…

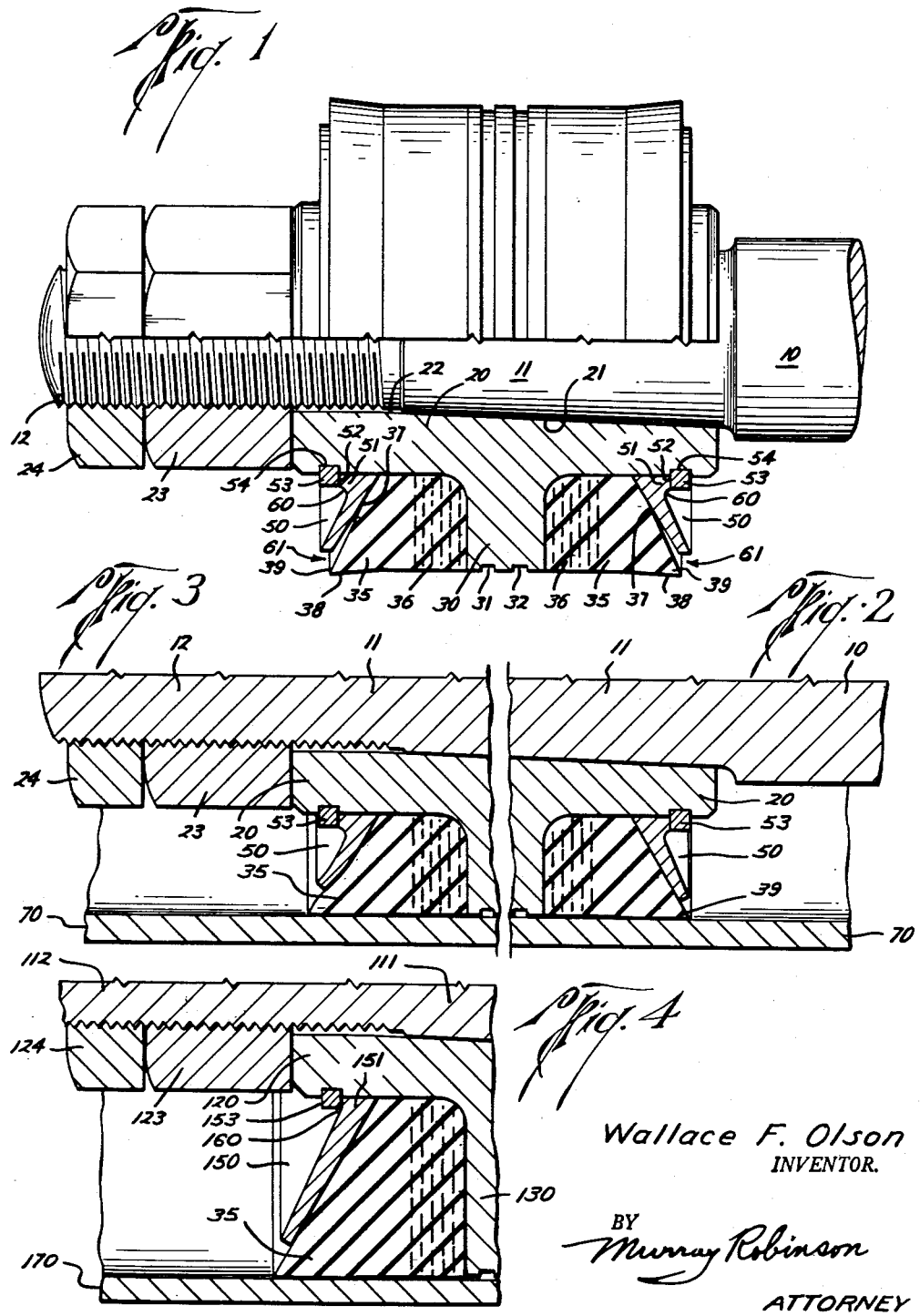

United States Patent Office 2,987,354
Patented June 6, 1961

2,987,354
PUMP PISTON
Wallace F. Olson, Oklahoma City, Okla., assignor to American Iron & Machine Works Company, Inc., Oklahoma City, Okla., a corporation of Delaware
Filed May 22, 1959, Ser. No. 815,180
3 Claims. (Cl. 309—4)

This invention pertains to pistons and more particularly to slush pump pistons such as are used in pumps that circulate mud in the hole during drilling of oil and gas wells.

Slush pumps are usually double acting and employ a pair of lip type seal rings disposed around the piston body at each end thereof for sealing with the pump cylinder liner. The rings are disposed in annular grooves in the body formed between the center flange of the body and the end plates of the body. In order to insert the rings in the grooves, the body is made in a plurality of parts releasably secured together. One typical body construction comprises a core having an integral center flange and two separate end plates placed on the core after the rings have been placed thereon, the plates being held on by snap rings.

In operation of the typical slush pump piston above described, the seal rings may swell due to temperature rise and/or absorption of other materials such as oil. This will cause too great a pressure between the rings and pump liner and cause the rings to wear out too quickly. To avoid this it has heretofore been known to leave space between the rings and end plates into which the rings can expand. There is a disadvantage in this construction, however, in that there is inadequate support for the rings due to the spaces between rings and plates.

In order to enhance the sealing qualities of the lip seal rings, each ring may be made with a lip diameter slightly larger than the cylinder liner diameter so that the lip must be flexed slightly when the piston is placed in the liner, thus assuring good initial engagement of lip and liner. To avoid too high an initial stress in the lip so that it will flex away from the liner on the suction stroke and not wear out too quickly, it has heretofore been known to leave a space in the piston body for the seal ring to flow into as the ring is placed under stress during insertion in the liner. The space is made just large enough to accommodate the displaced rubber so that the piston body will engage and support the seal ring after the piston is placed in the liner. However this still does not take care of the problem of swelling of the rings due to heat and absorption. As noted previously, if the space between ring and end plate is made large enough to accommodate swollen rings, prior to such swelling the rings will be inadequately supported, especially during the suction stroke, and during the pressure stroke the space between ring and end plate will be open sufficiently to accumulate any harmful foreign matter that may be present, such as sharp edged hard solid particles, e.g., sand.

It is the principal object of the invention to provide a slush pump piston which will eliminate excessive pressure between the seal rings and liner due both to initial oversizing of the seal rings and to swelling of the seal rings after installation and at the same time will provide adequate support for the seal rings at all times and avoid open spaces where foreign matter may accumulate.

Generally speaking, it is the object of the invention to provide a slush pump construction that will have a longer life between replacements of piston rings than has heretofore been possible.

According to the invention, a piston is provided having a body comprising a core with an integral center flange and removable end plates held in position by snap rings and positioned relative to the seal rings so that when the piston is assembled outside the liner there is some axial compression of the seal rings near their central portions to hold them tightly against the center flange but wherein the outer portions of the seal rings are spaced from the end plates just enough so that when the piston is assembled in the pump liner the seal rings engage the end plates all the way from the inner to outer diameter of the seal rings and characterized further in that the end plates are of tapered cross-section from their hubs to their tips so as to be sufficiently flexible to accommodate for swelling of the seal rings with heat and absorption, thereby maintaining the shape of the seal rings and keeping the pressure between the seal rings and liner low, thus prolonging the life of the seal rings with respect to abrasion by the liner and relative to splitting, cracking and tearing of the seal rings which occurs when they extrude between the end plates and liner under excessive pressure, the end plates being of relatively thin cross-section throughout compared to their radial dimensions so that the desired flexure is obtained by cumulative deformation from the inner diameter to the outer diameter of the plates, thereby assuring a uniform strain throughout and enabling their cross-sections to be thick enough everywhere to provide adequate support for the seal rings on the suction strokes.

Other objects and advantages of the invention will appear from the following description of a preferred embodiment thereof, reference being made to the accompanying drawings wherein:

FIGURE 1 is a half-section of a pump piston embodying the invention, showing same disposed on the end of a piston rod but not installed in a pump;

FIGURES 2 and 3 are fragmentary sectional views of the inner and outer ends of the piston assembly shown in FIGURE 1, but showing the piston disposed inside a pump liner, FIGURE 2 showing the piston in the condition when initially installed and FIGURE 3 showing same later, after use;

FIGURE 4 is a view similar to FIGURE 3 showing a modification, the piston however being shown as initially installed rather than after use.

Referring to FIGURES 1 through 3, there is shown a piston rod 10 terminating in a tapered portion 11 and a threaded portion 12. On the piston rod is disposed a piston body comprising a tubular core 20 having an opening therethrough that is tapered at 21 correlative to tapered portion 11 of the piston rod and is straight at 22 adjacent the threaded portion 12 of the piston rod. The core 20 is forced onto the tapered end of the piston rod and held in place by nut 23 and lock nut 24.

The core 20 has an integral central radial flange 30 provided with wear indicating grooves 31, 32. Disposed on the ends of the core adjacent flange 30 are seal rings 35 made preferably of oil resistant natural or synthetic rubber compound having a durometer hardness in the range of 65 to 95, with backup portions 36 adjacent flange 30 reinforced with layers of fabric. The outer ends of the rings are conically dished at 37 and the ends of the outer peripheries of the rings flare radially outward somewhat at 38 beyond the diameter of flange 30 and backup portions 36, forming flexible lips 39.

The seal rings are held at their central portions under slight axial compression, e.g., .02–.06 inch compression for each ring for rings that are of the order of 5 to 8 inches in diameter, by means of conical end plates 50. The end plates are slightly thickened at their inner diameters to provide hubs having radial outer faces 52 to engage split snap rings 53. The snap rings lie in grooves 54 in the ends of core 20, thereby maintaining the end plates in place. The end plates taper in cross-section from a thicker portion adjacent the hubs 51 to a thinner portion adjacent lips 39. The taper is preferably uniform as shown all the way from the hubs to outer peripheries of the plates, and the hubs are small, not extending radially much beyond the snap rings, so as to make the end plates thin and flexible over their whole radial extent. The end plates are made of ordinary carbon steel and the drawings are to scale showing a thickness for the end plates of the order of a quarter to an eighth of an inch. Arcuate portions 60 at the juncture of the hubs 51 with the bodies of the end plates 50 facilitate flexure of the end plates. Summarizing, flexure of the end plates is facilitated by use of thin tapered plates having small radius hubs joined to the plates by arcuate portions.

In FIGURE 1 there are shown spaces 61 between the inner conical faces of the end plates and the more steeply conical end faces of the seal rings. These spaces would extend all the way to the core 20 were it not for the initial axial compression of the rings when assembled on the core. As shown, these spaces terminate about half way down the inner faces of the end plates. When the piston is placed in the piston liner 70 as shown in FIGURE 2, these spaces close up, the end plates engaging over their full area with the seal rings so as to support them adequately, especially on the suction stroke, yet leaving enough of the lip free to flex away from the liner slightly on the suction stroke to reduce wear.

The same desirable relationship of seal ring and end plate is maintained, in the construction according to the invention, even after the seal rings have swollen in use due to heat and absorption. This condition is illustrated in FIGURE 3. The end plate 50 has flexed outwardly to accommodate swelling of the seal rings 35 so that they are still properly supported, yet not extruded between end plate and liner nor under such high pressure as to cause rapid wear, splitting, cracking, or tearing, nor to prevent inward flexure of the tip on the suction stroke.

FIGURE 4 shows a modification applicable to larger size pistons. The parts are given the same numbers as in FIGURES 1–3 except for the addition of 100 thereto; therefore repeated description of the similar parts is unnecessary. The distinction between the FIGURE 4 embodiment and that previously described lies in the fact that due to the larger radius of the piston, each end plate can taper down almost uniformly from the hub to outer periphery without need for a large radius of curvature at the juncture of the hub 151 with the body of the plate 150; there is however still an arcuate portion 160 of smaller radius of curvature than portion 60.

In both embodiments of the invention the taper angle of the end plates may be of the order of five degrees. For example the outer face of each end plate may make an angle of 65 degrees, with the piston axis and the inner face an angle of 60 degrees therewith. The taper causes the greater portion of the flexing of the end plates to take place at the outer portions thereof adjacent the portion of the seal rings that are initially just barely in contact with the end plate. The initial spaces 60 assure that only the strength of the flexible rubber lips need be overcome in assembling the piston in the liner, and the increased flexibility of the outer portions of the end plates permit further flexure and expansion of the tips of the seal rings while maintaining adequate support thereof, especially on the suction stroke, and the thicker portions of the plates assure a firm grip on the seal rings at all times yet are thin and flexible enough to avoid any sharp sudden bends or changes of curvature and resulting stress concentrations in the end plates and seal rings as the seal rings swell and the end plates flex.

As the seal rings wear in use, the end plates flex back toward their initial positions, thus maintaining contact of seal ring lip and cylinder liner and adding to the useful life of the seal rings.

While a preferred embodiment of the invention has been shown and described, many modifications thereof can be made by one skilled in the art and it is intended to cover by Letters Patent all forms of the invention falling within the scope of the following claims.

I claim:

1. In a slush pump comprising a core having a radial center flange, a pair of seal rings disposed on said core adjacent said flange on opposite sides thereof, an end plate disposed on each end of the core adjacent one of the seal rings, releasable means holding said end plates in position on said core, the end faces of said seal rings being dished, said end plates being dished, each end plate having an inner portion near said core and an outer peripheral portion and a medial portion therebetween, the acute angle between the end faces of the seal rings and the core axis being greater in the relaxed state of the seal rings than the acute angle between the inner face of each end plate and the core axis whereby said medial portions are out of engagement with said seal rings in the relaxed state leaving spaces therebetween, said seal rings having tapered outer peripheral portions extending radially beyond said center flange, the volume of the portion of said rings extending radially beyond said flange being of the same order of magnitude as said spaces, whereby said spaces are closed up when the piston is placed in its cylinder, the improvement characterized by the acute angle between the medial portion of the outer face of each end plate and the core axis being greater than said acute angle between the medial portion of the inner face of each end plate and the core axis, said end plates being increasingly flexible progressing radially outward along said medial portions to bend away from said center flange upon swelling of said rings.

2. A pump piston comprising a rigid body having a radially extending flange, a ring of sealing material around said body adjacent said flange, a flexible annular plate around said body on the opposite side of said ring from said flange, said plate having a central hub portion of greater thickness than the remainder of the plate extending axially from said plate away from said flange, said body having a groove therearound adjacent said hub, a split snap ring in said groove, said hub having substantially the same radius as said snap ring, said plate tapering down in thickness from said hub to the outer periphery thereof, the face of said plate adjacent said ring being conical when the plate is unflexed and appearing then in axial section as a straight line extending from said body to adjacent the outer periphery of said plate.

3. A pump piston comprising a rigid body having a radially extending annular flange, a ring of rubber compound sealing material around said body adjacent said flange, a flexible annular retainer plate around said body on the opposite side of said ring from said flange, said plate having a central hub portion and said body having means therearound adjacent said hub for holding said hub against said ring, said plate tapering down in thickness from said hub all the way to the outer periphery thereof, the thinnest portion of said plate being at said outer periphery, said ring having an end face dished in toward said flange, the surface of said retainer plate adjacent said end face flaring away from said flange, said ring having an outer peripheral surface which in the zone radially outward from said flaring surface of the retainer plate flares outwardly progressing in the direction going away from said flange, said flaring portion of the ring providing a seal lip, said seal lip being free to press outwardly against a pump liner and being adapted to be supported by said retainer plate, the flexible tapered structure of the plate causing the plate to flare away from said flange more to provide additional volume between the flange and plate within the cylindrical surface defined by the periphery of the flange as required to accommodate the seal ring when swollen, whereby said seal lip will not press radially outwardly against the liner with too great a force when the ring is swollen.

References Cited in the file of this patent

UNITED STATES PATENTS

| | | |
|---|---|---|
| 2,600,516 | Pielop | June 17, 1952 |
| 2,890,918 | Oldham | June 16, 1959 |